(12) United States Patent
Oba

(10) Patent No.: US 8,206,041 B2
(45) Date of Patent: Jun. 26, 2012

(54) HIGH POWER OPTICAL CONNECTOR AND OPTICAL FIBER SYSTEM USING THE SAME

(75) Inventor: Yasuhiro Oba, Sakura (JP)

(73) Assignee: Fujikura Ltd., Tokyo (JP)

( * ) Notice: Subject to any disclaimer, the term of this patent is extended or adjusted under 35 U.S.C. 154(b) by 376 days.

(21) Appl. No.: 12/406,420

(22) Filed: Mar. 18, 2009

(65) Prior Publication Data

US 2009/0238521 A1    Sep. 24, 2009

(30) Foreign Application Priority Data

Mar. 18, 2008    (JP) ................. 2008-069292

(51) Int. Cl.
G02B 6/36    (2006.01)
G02B 6/38    (2006.01)

(52) U.S. Cl. .............. 385/60; 385/70; 385/72; 385/75; 385/78

(58) Field of Classification Search .................. None
See application file for complete search history.

(56) References Cited

U.S. PATENT DOCUMENTS

| | | | |
|---|---|---|---|
| 7,316,511 B2 | 1/2008 | Mine et al. | |
| 2002/0048293 A1* | 4/2002 | Malone | 372/29.011 |
| 2006/0039655 A1* | 2/2006 | Wilson | 385/79 |

FOREIGN PATENT DOCUMENTS

| | | | |
|---|---|---|---|
| CN | 1769938 A | 5/2006 | |
| JP | 63-249118 A | * 10/1988 | |
| JP | 3-17284 Y2 | 4/1991 | |
| JP | 3-148611 A | 6/1991 | |
| JP | 7-301537 A | 11/1995 | |
| JP | 08-171030 A | 7/1996 | |
| JP | 2835384 B2 | 12/1998 | |
| JP | 11-174272 A | 7/1999 | |
| JP | 2003-066291 A | 3/2003 | |
| JP | 2004-29450 A | 1/2004 | |
| JP | 2004-77658 A | 3/2004 | |
| JP | 2006-003661 A | 1/2006 | |
| JP | 3831315 B2 | 10/2006 | |
| JP | 2007-248732 A | 9/2007 | |
| JP | 2007-293298 A | 11/2007 | |
| WO | 2006/001165 A1 | 1/2006 | |
| WO | 2007/116792 A1 | 10/2007 | |

OTHER PUBLICATIONS

Chinese Office Action dated Jun. 3, 2010, issued in corresponding Chinese Patent Application No. 200910128440.4.
Chinese Office Action dated Jul. 5, 2011, issued in corresponding Chinese Patent Application. No. 200910128440.4.
Japanese Office Action dated Feb. 7, 2012, issued in corresponding Japanese Patent Application No. 2008-069292. English Translation.

* cited by examiner

*Primary Examiner* — Michelle R Connelly

(74) *Attorney, Agent, or Firm* — Westerman, Hattori, Daniels & Adrian, LLP

(57) ABSTRACT

This high power optical connector is used at least on a light-receiving side of an optical fiber. The high power optical connector is provided with: a housing; a ferrule which is accommodated in the housing to retain the optical fiber; and a flange which is connected and fixed to the housing while being in contact with an end portion of the ferrule. The ferrule is made of a transparent glass; and the flange is made of a transparent material which transmits a light which propagates through the optical fiber.

7 Claims, 3 Drawing Sheets

HIGH POWER OPTICAL CONNECTOR AND OPTICAL FIBER SYSTEM USING THE SAME

Priority is claimed on Japanese Patent Application No. 2008-069292, filed on Mar. 18, 2008, the contents of which are incorporated herein by reference.

BACKGROUND OF THE INVENTION

1. Field of the Invention

The present invention relates to a high power optical connector, and more particularly, to a high power optical connector suitable for connection of an optical fiber for high power transmission of several hundreds of mW to several tens of W. In addition, the present invention relates to an optical fiber system using the high power optical connector on a receiving side.

2. Description of the Related Art

Conventional arts in relation to the present invention are disclosed in, for examples, Patent Documents described as follows.

In Japanese Unexamined Patent Application, First Publication No. 2004-29450 (hereinafter, referred to as Patent Document 1) and Japanese Patent, Publication No. 3831315 (hereinafter, referred to as Patent Document 2), techniques for reducing power density by increasing mode field diameters are disclosed.

In Japanese Patent, Publication No. 2835384 (hereinafter, referred to as Patent Document 3), an optical fiber connector which detachably connects first and second optical fibers used for high-power laser beam and has temperature measuring device for measuring the temperature of a connection portion—Between the first and second optical fibers, is disclosed.

In Japanese Examined Utility Model Application, First Publication No. H03-17284 (hereinafter, referred to as Patent Document 4), an optical connector in which a space is provided in the vicinity of fiber end faces to thereby prevent being heated and damaged even if portions other than the end faces are irradiated, is disclosed.

In general, for an optical connector, a zirconia ferrule is used. Since zirconia absorbs light leakage, the temperature of the ferrule portion increases, and the temperature of an adhesive for fixing a fiber inside a fine hole also increases. As a result, there is a concern that changes in characteristics such as degradation of adhesion and an increase in absorptance occur.

In addition, when the ferrule portion is inserted into a general optical connector, a sleeve expands. Therefore, the sleeve and a housing are designed to have a slight gap. Accordingly, light leakage is absorbed by the zirconia ferrule which results in storing heat. As a result, when high power light leaks, the temperature of the ferrule portion rapidly increases, and the adhesive and the like may be damaged.

In the optical connector structure disclosed in Patent Document 3, light leakage is absorbed by a portion with the highest power density in the vicinity of a connection point. In this structure, when the temperature increase is detected, there is a high possibility in that the end face is already damaged. Therefore, reliability is low.

In addition, in this conventional technique, the temperature is monitored at a position apart from the point absorbing light. Therefore, a difference between the temperatures of the practical ferrule and the monitor occurs, or a time lag (time interval) at the time of monitoring occurs. This results in low reliability.

It is thought that the optical connector structure disclosed in Patent Document 1 is effective when light of about 1 W is transmitted by using a single-mode fiber for communications. However, in the case of a high power light transmission of about 10 W which is the target of the present invention, temperature increase in a position irradiated by light leakage is high even though a mode field diameter is increased, and this may damage the structure.

In the optical connector structure disclosed in Patent Document 4, light is focused on a lens to enter the optical connector. However, in this structure, a connection loss is greater than that of a PC (physical contact) connection. Accordingly, power of incident light needs to be increased, or the number of LDs (laser diodes) needs to be increased. This results in increases in power consumption and costs.

The present invention was made in view of the above-mentioned circumstances and has an object of providing a high power optical connector which will not be damaged during connection between optical fibers for high power light transmission and guarantees a long life-span, and an optical fiber system using the same.

SUMMARY OF THE INVENTION

The present invention employs the followings to solve the above-mentioned problems and accomplish the related object.

(1) According to an aspect of the present invention, there is provided a high power optical connector used at least on a light-receiving side of an optical fiber, the high power optical connector including: a housing; a ferrule which is accommodated in the housing to retain the optical fiber; and a flange which is connected and fixed to the housing while being in contact with an end portion of the ferrule, wherein: the ferrule is made of a transparent glass; and the flange is made of a transparent material which transmits a light which propagates through the optical fiber.

(2) In the high power optical connector described in (1), the flange may be provided with a sensor for detecting a light that leaks from the optical fiber.

(3) In the high power optical connector described in (1), the material of the flange may be with fine particles. In this case, by the fine particles, light that transmits through the flange can be scattered.

(4) In the high power optical connector described in (1), a surface of the flange, which faces the end portion of the ferrule, may be provided with an uneven portion. In this case, by the uneven portion, light that transmits through the flange can be scattered.

(5) In the high power optical connector described in (1), a plurality of the ferrules may be mounted to the flange.

(6) In the high power optical connector described in (1), the ferrule may satisfy the following equation (1):

$$L < a\sqrt{(n^2 - NA^2)}/NA \quad (1)$$

where:
L is a length of the ferrule;
a is a diameter of the ferrule;
n is a refractive index of the ferrule; and
NA is a numerical aperture of the optical fiber.

(7) According to another aspect of the present invention, there is provided an optical fiber system in which an incident-side optical connector is connected to one side of an optical fiber while a receiving-side optical connector is connected to other side thereof, wherein: the high power optical connector according to any one of claims 1 to 6 is used as the receiving-side optical connector; and an optical connector having a stainless steel ferrule or a zirconia ferrule is used as the incident-side optical connector.

In the high power optical connector described in (1), the ferrule of the receiving-side optical connector is made of the transparent glass and the flange is made of the transparent material which transmits infrared light, so that light leakage can be allowed to transmit through the glass ferrule and the transparent flange to exit outside. As a result, it prevents heat from accumulating in the high power optical connector. Therefore, the high power optical connector is not damaged when used for connection of optical fibers for high power light transmission and guarantees a long life-span.

In addition, in the case of (2), light leakage can be detected by the sensor. As a result, as compared with the case where light leakage is detected by the temperature sensor, light leakage can be detected in a shorter time after a connection loss occurs.

In addition, in the case of (3) or (4), light leakage can be scattered by the flange. As a result, the light leakage can be scattered to enter the sensor. Therefore, a connection error in the plurality of the optical connectors can be rapidly detected by using the single sensor.

In addition, in the case of (6), light leakage does not reflect in the ferrule and spreads out. Therefore, components around the ferrule do not absorb the light leakage, and thus it is less likely that the heat generation is worried.

In addition, in the case of (5), the same effects as those of the high power optical connector described in (1) can be obtained.

In addition, in the optical fiber system of (7), the same effects as those of the high power optical connector described in (1) can be obtained.

DETAILED DESCRIPTION OF THE INVENTION

Hereinafter, embodiments of a high power optical connector and an optical fiber system using the same of the present invention will be described with reference to FIGS. 1 to 3C.

First Embodiment

Figure 1:
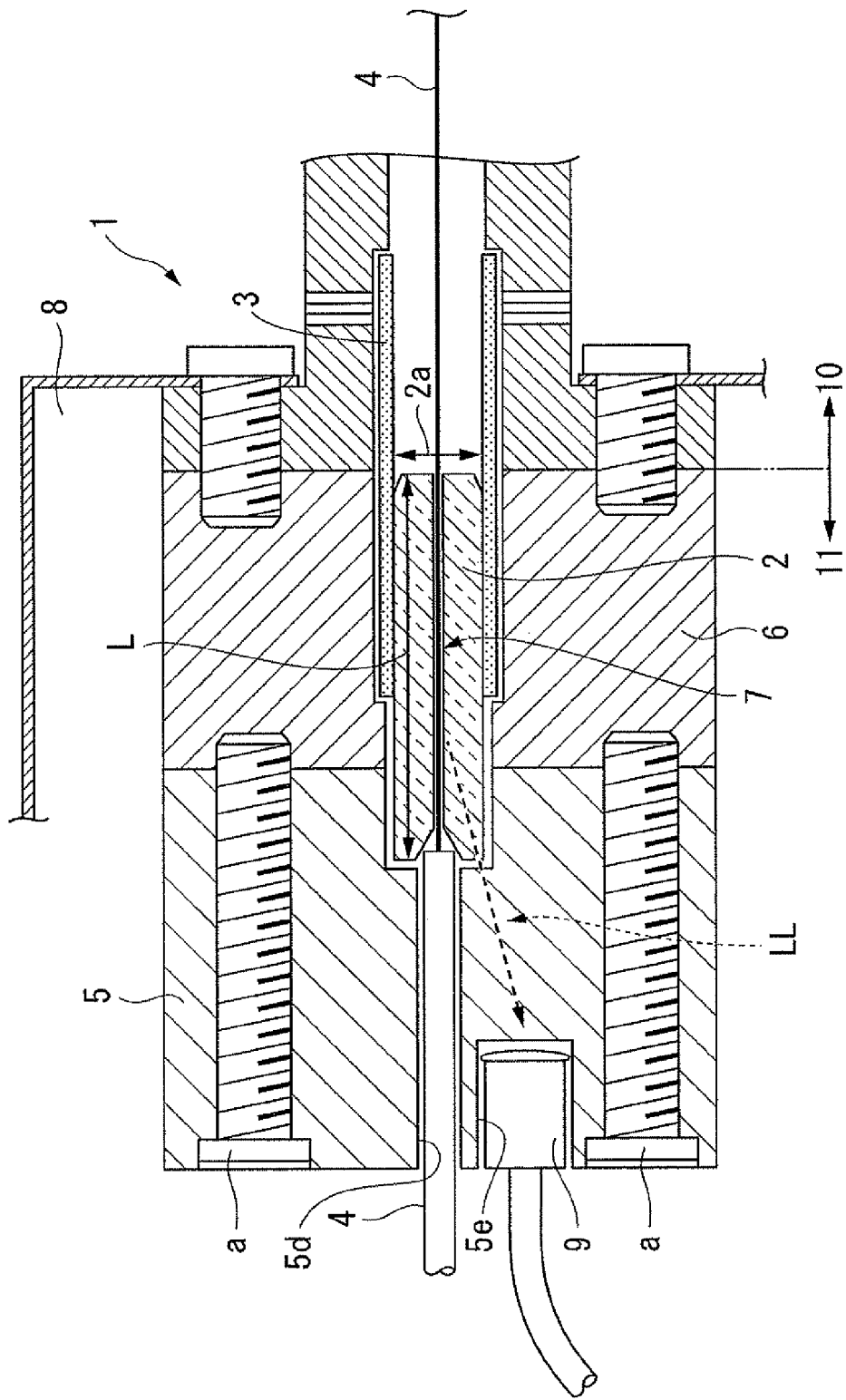
FIG. 1 is a cross-sectional view illustrating a main portion from a cross-sectional view including an axis of an optical fiber, according to a first embodiment of a high power optical connector of the present invention.

FIG. 1 is a cross-sectional view illustrating a main portion from a cross-sectional view including an axis of an optical fiber, according to a first embodiment of the high power optical connector of the present invention. In FIG. 1, reference numeral 1 denotes the high power optical connector (hereinafter, referred to as optical connector), reference numeral 2 denotes a glass ferrule, reference numeral 3 denotes a zirconia sleeve, reference numeral 4 denotes an optical fiber, reference numeral 5 denotes a flange, reference numeral 6 denotes a housing, reference numeral 7 denotes an adhesive, reference numeral 8 denotes a chassis, reference numeral 9 denotes a photodiode (hereinafter, abbreviated to PD) used as a sensor, reference numeral 10 denotes an excitation light source side (hereinafter, denoted by LD side), and reference numeral 11 denotes a receiving side.

In FIG. 1, only the glass ferrule 2 of the optical connector 1 on the receiving side 11 is shown, and a ferrule of the optical connector on the LD side 10 is not shown. As the ferrule, a zirconia ferrule or a stainless steel ferrule may be employed.

The optical connector 1 of the embodiment includes the ferrule 2 retaining the optical fiber 4 and the flange 5 that comes in contact with the ferrule 2. The ferrule 2 of the optical connector 1 on the receiving side (light-receiving side) 11 is made of a transparent glass material, and the flange 5 is made of a material transmitting infrared light. The flange 5 is connected and fixed to the main body of the housing 6 with a plurality of bolts a. In a through-hole 5d formed along the central axis of the flange 5, the optical fiber 4 is inserted along the same axis. In addition, in a concave portion 5e formed at an outer end surface of the flange 5, the PD 9 is inserted and fixed to be substantially parallel with the axis of the optical fiber 4 and allow a light-receiving surface to face the side of the glass ferrule 2.

In a related art, in the case where the numerical aperture (NA) of an incident-side optical fiber is different from the numerical aperture (NA) of a receiving-side optical fiber due to the limitations of the optical system, when the incident side and the receiving side are connected to each other, there is a concern that light of about 1 dB or less leaks continuously. For example, when light with an intensity of about 10 W enters, light of about 2 W or less leaks. When an optical connector having a general zirconia ferrule is used, the light leakage is absorbed by the end face of the optical connector, as time advances, the temperature of the ferrule or an adhesive at the end face of the optical connector increases. When the optical connector is continuously operated without realizing the increase in temperature, the adhesive is deteriorated, the optical fiber falls off, and a laser beam may leak out.

In addition, in a related art, when a worker who is not used to handling the optical connector removes or replaces the optical connector, there is a possibility that a laser apparatus may be started to operate while the optical connector is in a half-insertion state. In this case, a space is generated between connection end faces of a pair of optical connectors which are coupled together, and light of about several W or less leaks. This increases the temperature of the vicinity of the connection end faces, and the end faces may be damaged.

In conventional optical communications, at a light intensity of equal to or less than 1 W, the optical connector is not heated and not damaged by heating even when a connection loss occurs. Accordingly, the optical connector is first tried to be connected, and when a loss of light intensity is high, the optical connector is re-connected. This kind of handling was enough to deal with the problem.

However, when a connection is made in a high power light transmission path which carries a high intensity of light of about 10 W, as a connection loss increases, the temperature of the end face of the optical connector rapidly increases, and components or adhesives around the end face are burnt out or the optical fiber is broken down. In this case, replacing the optical fiber is needed.

In order to solve the above-mentioned problems, in this embodiment, the optical connector 1 employs a configuration as illustrated in FIG. 1. With such a configuration, even when a connection loss is high, a rapid increase in temperature is prevented, and malfunction of the optical connector 1 can be detected before the optical connector 1 is broken down. Therefore, safety can further be improved. Specifically, as the ferrule of the optical connector 1 on the receiving side 11, the glass ferrule 2 is employed, and the flange 5 employs a material having high permeability for infrared light.

Since the glass ferrule 2 and the flange 5 on the receiving side 11 are made of materials with high transparencies, the light leakage LL spreads in the glass ferrule 2 and leaks out of the glass ferrule 2 to transmit through the flange 5. Thereafter, the light leakage LL is detected by the PD 9 provided on the rear side of the flange 5. The power density of the light leakage that transmits through the glass ferrule 2 and the flange 5 made of the transparent materials decreases as the light travels, and the power density of the light at the end face of the glass ferrule 2 is small enough not to cause a problem of heat generation. In addition, there is no concern that the components of the optical connector 1 are heated and deformed or burnt before the light is detected by the PD 9.

As the material used for the glass ferrule 2 on the receiving side 11, a general glass material such as borosilicate glass may be used.

In addition, as the material that is used for the flange 5 and has high transparency for infrared light, for example, there are acrylic resin, silicon resin, PMMA resin, allylic ester resin, PSX resin, and the like.

In addition, as the ferrule (not shown) of the incident-side optical connector, a stainless steel ferrule, a zirconia ferrule, or a ferrule having high abrasion resistance are preferable. For applications in which the incident-side optical connector is connected and detached frequently, by connecting or detaching (referred to as detaching and mounting the ferrule again, and replacing the ferrule with another) the ferrule on the incident side, stable connection for a long time can be obtained.

In this embodiment, in order for the light leakage LL not to reflect in the glass ferrule 2, it is preferable that the following equation (1) be satisfied:

$$L < a\sqrt{(n^2 - NA^2)}/NA \qquad (1)$$

where L is the length of the glass ferrule 2, a is the diameter of the glass ferrule 2, n is the refractive index of the glass ferrule 2, and NA is the numerical aperture of the fiber.

In the glass ferrule 2 satisfying the above equation (1), the light leakage LL does not reflect and spreads out. Therefore, components (for example, the housing 6) around the glass ferrule 2 do not absorb the light leakage LL, and thus it is less likely that the heat generation is worried.

In addition, an optical fiber system (not shown) in which an incident-side optical connector is connected to a side of an optical fiber and a receiving-side optical connector is connected to the other side thereof, may apply the optical connector having the aforementioned configuration. In this case, a configuration in which, as the receiving-side optical connector, the aforementioned high power optical connector is used and, as the incident-side optical connector, an optical connector having a stainless steel ferrule or a zirconia ferrule is used, may be employed.

Second Embodiment

Figure 2:
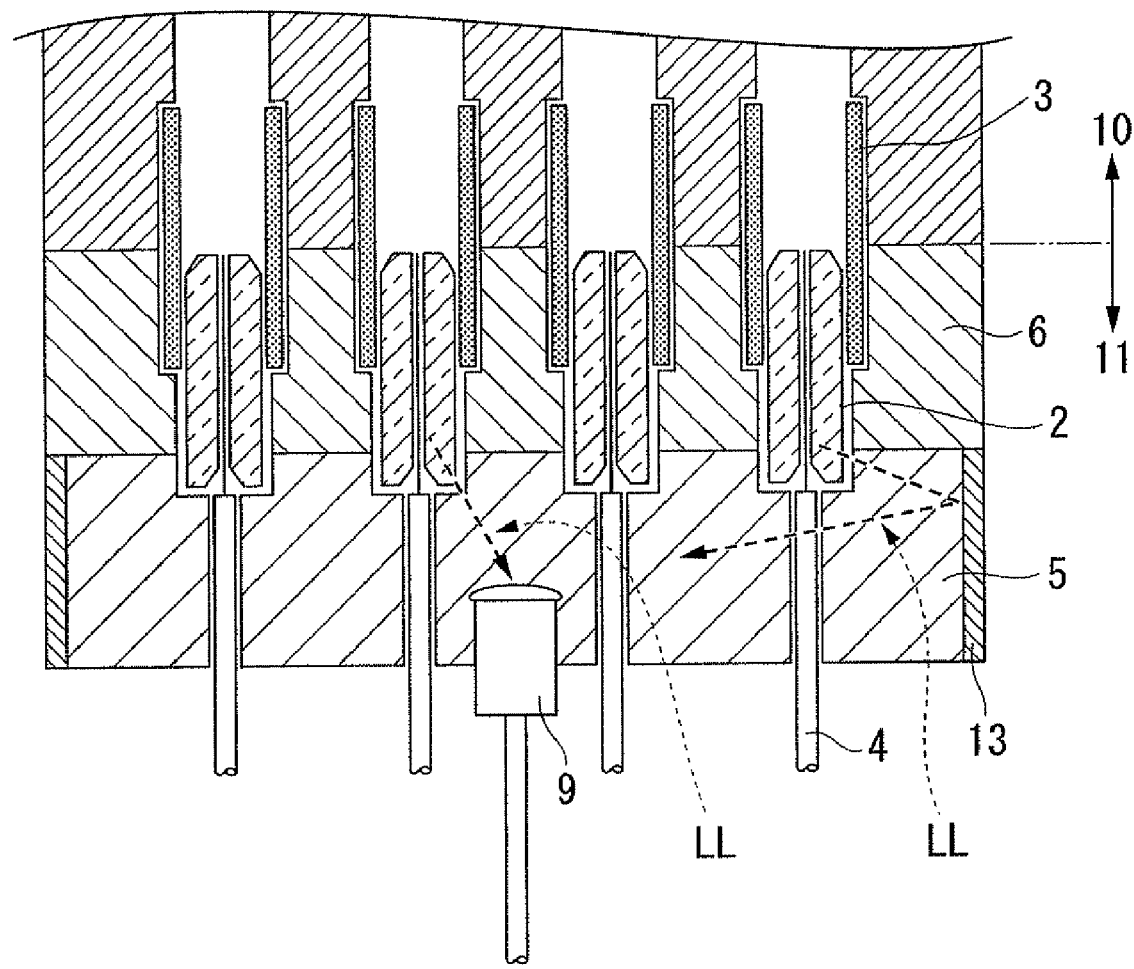
FIG. 2 is a cross-sectional view illustrating a main portion from a cross-sectional view including an axis of an optical fiber, according to a second embodiment of a high power optical connector of the present invention.

FIG. 2 is a cross-sectional view illustrating a main portion from a cross-sectional view including an axis of an optical fiber, according to a second embodiment of the high power optical connector of the present invention. In the following description, like elements corresponding to the elements of the first embodiment are denoted by like reference numerals, and only differences between the embodiments are described.

In this embodiment, a plurality of glass ferrules 2 is mounted to a flange 5. In addition, the flange 5 is added with fine particles (for example silica), and by the fine particles, infrared light transmitting through the flange 5 is scattered.

In addition, in the example of FIG. 2, at the peripheral surface of the flange 5, a reflective layer 13 for allowing light that propagates to leak out of the peripheral surface to be reflected toward the PD 9, is provided. The reflective layer 13 can be omitted.

In the configuration of the embodiment, the plurality of the glass ferrules 2 are mounted to the flange 5, and the fine particles are added to the flange 5 so that infrared light that transmits through the flange 5 is scattered by the fine particles. Therefore, a connection error in a plurality of optical connectors can be rapidly detected by a single PD 9.

In addition, in this embodiment, an optical fiber system (not shown) in which an incident-side optical connector is connected to a side of an optical fiber and a receiving-side optical connector is connected to the other side thereof can apply the optical connector having the abovementioned configuration. In this case, a configuration in which, as the receiving-side optical connector, the aforementioned high power optical connector is used and, as the incident-side optical connector, an optical connector having a stainless steel ferrule or a zirconia ferrule is used, may be employed.

Third Embodiment

Figure 3A:
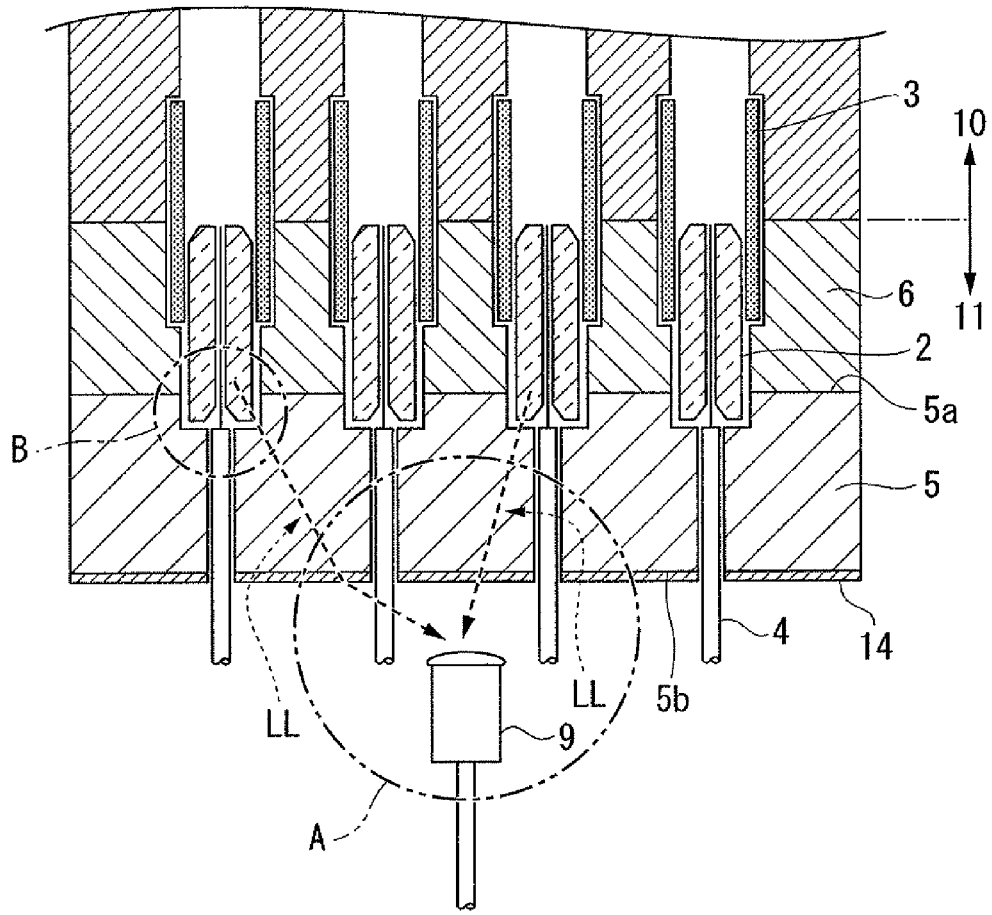
FIG. 3A is a cross-sectional view illustrating a main portion from a cross-sectional view including an axis of an optical fiber, according to a third embodiment of a high power optical connector of the present invention.

FIG. 3A is a cross-sectional view illustrating a main portion from a cross-sectional view including an axis of an optical fiber, according to a third embodiment of the high power optical connector of the present invention. In the following description, like elements corresponding to the elements of the second embodiment are denoted by like reference numerals, and only differences between the embodiments are described.

In this embodiment, similarly to the second embodiment, a configuration in which a plurality of glass ferrules 2 is mounted to the flange 5, and at a surface 5b on the opposite side to a connection-side surface 5a of the flange 5, a scattering layer 14 for scattering light leakage LL which exits from the surface 5b is provided, is employed. In addition, a PD 9 is disposed to face the rear of the scattering layer 14.

Figure 3B:
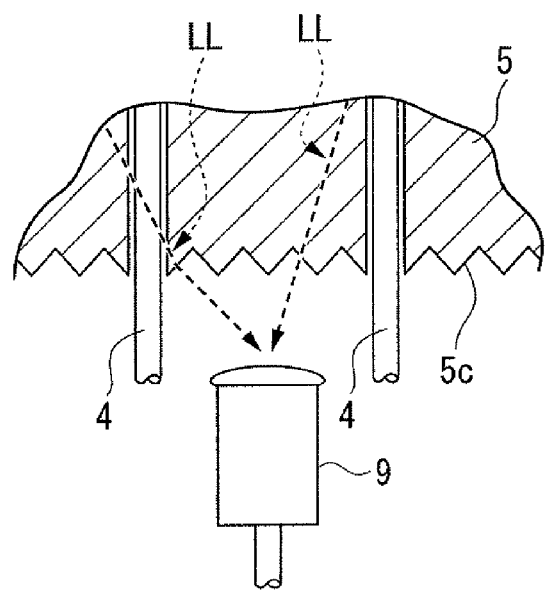
FIG. 3B is an enlarged view illustrating a portion-A of FIG. 3A, according to a modified example of a third embodiment.
Figure 3C:
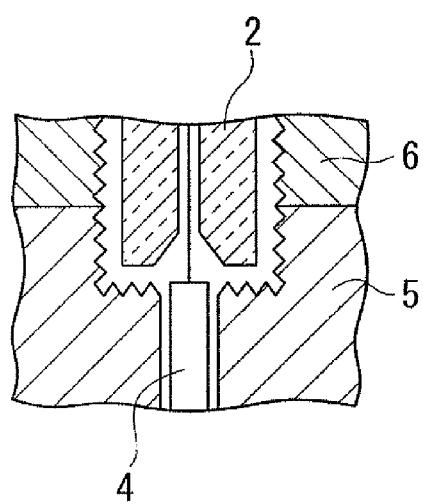
FIG. 3C is an enlarged view illustrating a portion-B of FIG. 3A, according to a modified example of the third embodiment.

In this embodiment, as the flange 5, similarly to the second embodiment, a flange 5 added with fine particles may be used, or a flange 5 that does not contain fine particles may also be used. As the scattering layer 14, a transparent resin added with fine particles may be stacked. Otherwise, as illustrated in FIG. 3B, a structure in which an uneven portion 5c is formed at the surface of the flange 5 to scatter the light leakage LL may be employed. In addition, as illustrated in FIG. 3C, an uneven portion 5g may be formed at a surface of the flange 5, which faces the end face of a glass ferrule 2. In this case, the light leakage LL can also be scattered.

In the configuration of the embodiment, a plurality of the glass ferrules 2 is mounted to the flange 5, and the scattering layer 14 is provided at the surface on the opposite side to the connection side of the flange 5 to scatter infrared light transmitting through the flange 5. Therefore, a connection error in the plurality of the optical connectors can be rapidly detected by a single PD 9.

In addition, in this embodiment, an optical fiber system (not shown) in which an incident-side optical connector is connected to a side of an optical fiber and a receiving-side optical connector is connected to the other side thereof, may apply the optical connector having the aforementioned configuration. In this case, a configuration in which, as the receiving-side optical connector, the aforementioned high power optical connector is used and, as the incident-side optical connector, an optical connector having a stainless steel ferrule or a zirconia ferrule is used, may be employed.

Example

In order to verify the effects of the present invention, an optical connector having the same configuration as that of the first embodiment was prepared for experiments. Specifically, an FC optical connector (hereinafter, referred to as Example) which uses a glass ferrule for the receiving-side optical connector, and a flange made of an acrylic resin which transmits near infrared light that is signal light on the receiving side was manufactured.

In addition, a conventional-type FC optical connector (hereinafter, referred to as Comparative Example) which uses a conventional zirconia ferrule instead of the glass ferrule of Example was also manufactured.

A gap between connection end faces of each of the optical connectors of Example and Comparative Example was intentionally opened to generate a connection loss of 3 W. The temperatures of the connection portions in this case were measured by a thermocouple to be compared with each other. At the same time, a photodiode (PD) was mounted to the flange, and a time taken to detect light leakage after light leaks was measured. The measurement result is shown in Table 1.

TABLE 1

| Combination of Connector | | Temperature increase after 60 minutes | Temperature increase after 1 minute | Time to detect light leakage by PD |
|---|---|---|---|---|
| | LD side | Receiving side | | | |
| Comparative Example | Zirconia ferrule | Zirconia ferrule | 70° C. or higher | 40 | Cannot be detected |
| Example | Zirconia ferrule | Glass ferrule | 40° C. | 20 | In less than 1 second |

As can be seen from the result of Table 1, the optical connector of Example which uses the glass ferrule for the receiving side and the flange made of the transparent material to transmit infrared light has an advantage in that both of the temperature increases after 60 minutes and 1 minute were suppressed to be lower than those of Comparative Example. In addition, in Comparative Example, it was impossible to detect light leakage by the PD. However, in Example, light leakage could be instantly detected.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A high power optical connector used at least on a light-receiving side of an optical fiber, the high power optical connector comprising:
 a housing;
 a ferrule which is accommodated in the housing to retain the optical fiber; and
 a flange which is connected and fixed to the housing while being in contact with an end portion of the ferrule, wherein
 the ferrule is made of a transparent glass, and
 the flange is made of a transparent material which transmits a light which propagates through the optical fiber,
 wherein the high power optical connector includes a first side for receiving an incident-side optical connector,
 wherein the flange is provided with a sensor for detecting a light that leaks from a connection end face of the optical connector such that the sensor is positioned opposite to the first side of the high power optical connector, and
 wherein the sensor is disposed in a concave portion of the flange.

2. The high power optical connector according to claim 1, wherein the material of the flange is added with fine particles.

3. The high power optical connector according to claim 1, wherein a surface of the flange, which faces the end portion of the ferrule, is provided with an uneven portion.

4. The high power optical connector according to claim 1, wherein a plurality of the ferrules is mounted to the flange.

5. The high power optical connector according to claim 1, wherein the ferrule satisfies the following equation (1):

$$L < a \cdot \sqrt{(n^2 - NA^2)}/NA \quad (1)$$

where:
L is a length of the ferrule;
a is a diameter of the ferrule;
n is a refractive index of the ferrule; and
NA is a numerical aperture of the optical fiber.

6. A high power optical connector used at least on a light-receiving side of an optical fiber, the high power optical connector comprising:
 a housing;
 a ferrule which is accommodated in the housing to retain the optical fiber; and
 a flange which is connected and fixed to the housing while being in contact with an end portion of the ferrule, wherein:
 the ferrule is made of a transparent glass; and
 the flange is made of a transparent material which transmits a light which propagates through the optical fiber,
 wherein the ferrule satisfies the following equation (1):

$$L < a \cdot \sqrt{(n^2 - NA^2)}/NA \quad (1)$$

where:
L is a length of the ferrule;
a is a diameter of the ferrule;
n is a refractive index of the ferrule; and
NA is a numerical aperture of the optical fiber.

7. An optical fiber system in which an incident-side optical connector is connected to one side of an optical fiber while a receiving-side optical connector is connected to other side thereof, wherein:
 the high power optical connector according to any one of claims 2 to 5, and 6 is used as the receiving-side optical connector; and
 an optical connector having a stainless steel ferrule or a zirconia ferrule is used as the incident-side optical connector.

* * * * *